United States Patent
Kobuse et al.

(10) Patent No.: US 11,202,024 B2
(45) Date of Patent: Dec. 14, 2021

(54) IMAGING APPARATUS, IMAGING METHOD, AND STORAGE MEDIUM

(71) Applicant: CANON KABUSHIKI KAISHA, Tokyo (JP)

(72) Inventors: Takenori Kobuse, Kawasaki (JP); Yusuke Yamashita, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 94 days.

(21) Appl. No.: 16/854,108

(22) Filed: Apr. 21, 2020

(65) Prior Publication Data
US 2020/0344431 A1    Oct. 29, 2020

(30) Foreign Application Priority Data
Apr. 24, 2019    (JP) .............................. JP2019-082868

(51) Int. Cl.
*H04N 5/369*    (2011.01)
*H04N 5/357*    (2011.01)
*H04N 5/361*    (2011.01)
*H04N 5/378*    (2011.01)

(52) U.S. Cl.
CPC ............. *H04N 5/361* (2013.01); *H04N 5/378* (2013.01)

(58) Field of Classification Search
None
See application file for complete search history.

(56) References Cited

U.S. PATENT DOCUMENTS

| 7,948,545 | B2 | 5/2011 | Suzuki |
| 9,088,741 | B2 | 7/2015 | Sumi et al. |
| 10,021,325 | B2 | 7/2018 | Miyamoto |
| 2003/0001951 | A1* | 1/2003 | Tsujita ................... H04N 5/361 348/65 |

FOREIGN PATENT DOCUMENTS

| JP | 2005-175517 A | 6/2005 |
| JP | 2007-329161 A | 12/2007 |
| JP | 2011-120094 A | 6/2011 |
| JP | 2017-098791 A | 6/2017 |

OTHER PUBLICATIONS

The above foreign patent documents #1, #2 and #3 were cited in the Jan. 26, 2021 Japanese Office Action, without an English Translation, that issued in Japanese Patent Application No. 2019-082868.

* cited by examiner

*Primary Examiner* — Mark T Monk
(74) *Attorney, Agent, or Firm* — Cowan, Liebowitz & Latman, P.C.

(57) ABSTRACT

An imaging apparatus having a wide dynamic range and a stable black level without decreasing frame rate comprises a pixel unit including pixels, a read out unit for reading out the noise signal from each pixel and to amplify the noise signal by a first gain to generate a first noise signal, reads out the pixel signal and amplifies the pixel signal by the first gain and a second gain to generate a first and a second pixel signal, a first memory unit for storing a second noise signal generated by amplifying, by the second gain, the noise signal read out from a pixel of a predetermined row, and a subtraction unit for subtracting the first noise signal from the first pixel signal and to subtract the second noise signal stored in the first memory unit from the second pixel signal, while sequentially reading out signals from each pixel.

23 Claims, 13 Drawing Sheets

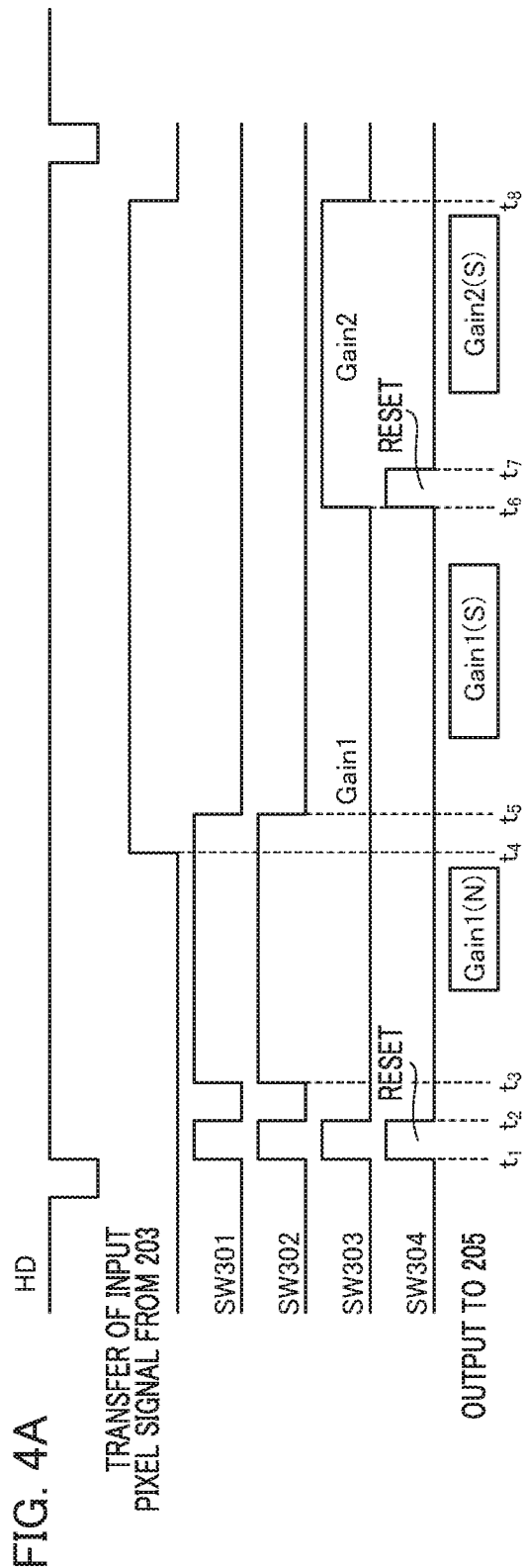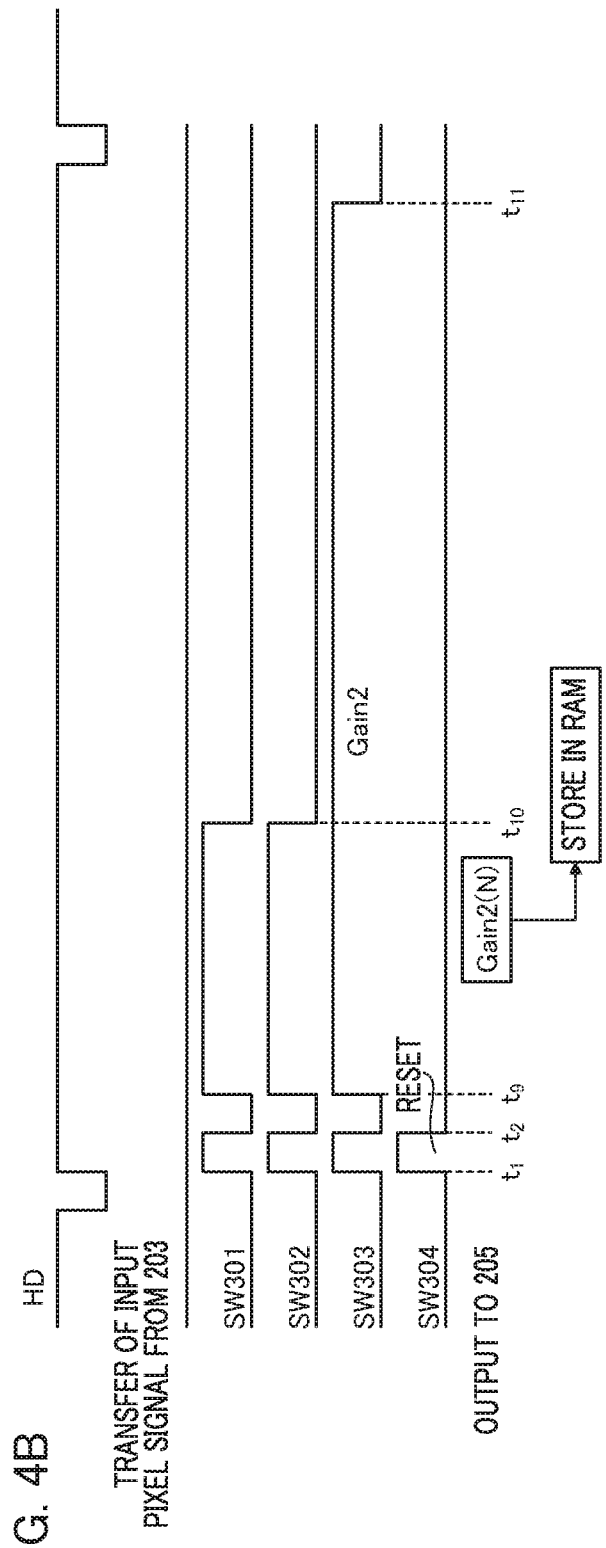

IMAGING APPARATUS, IMAGING METHOD, AND STORAGE MEDIUM

BACKGROUND OF THE INVENTION

Field of the Invention

The present invention relates to an imaging apparatus such as a digital camera and so on.

Description of the Related Art

Imaging apparatuses including an imaging device in which a plurality of pixels are arranged can not only output an image signal, but also includes, for example, a function of expanding a dynamic range.

An apparatus disclosed in Japanese Patent Laid-Open No. 2005-175517 is able to improve the dynamic range of an image signal by switching gains of an amplifier in a column circuit with respect to an output signal of a unit pixel, wherein the amplifier has two input capacitors for switching gains.

In general, when reading signals from imaging devices, a noise component signal is firstly read out from each of unit pixels, then an image signal including a noise component signal is read out. Thereafter, those output signals are subtracted in the imaging device so that the noise component is suppressed. Such method is known, for example, as a correlated double sampling method.

The correlated double sampling method is more effective when gain of an internal amplifier is large.

However, when reading out signals using the correlated double sampling method in the configuration such as Japanese Patent Laid-Open No. 2005-175517, it is necessary to read out noise signals and pixel signals twice each by different gains.

Therefore, a rate for reading out signals from each unit pixel decreases so that a frame rate also decreases as a result.

In addition, if noise signals are read out with a predetermined gain and pixel signals are read out twice each by different gains, then one of pixel signals cannot properly subtracts the noise signal.

In that case, if the pixel signal is read out without properly subtracting noise signal, then a pedestal level of image signal becomes unstable since black levels of the pixel signals correspond to noise signals.

SUMMARY OF THE INVENTION

One of aspects of the present invention is to provide an imaging apparatus that can expand the dynamic range by changing gains and can adjust the black level of image signals for each gain without decreasing the frame rate.

In order to solve the above problems, an imaging apparatus according to one aspect of the present invention comprises:

a pixel unit including a plurality of pixels arranged in rows and columns, wherein each pixel can output a noise signal and a pixel signal that is generated by photoconversion;

at least one processor or circuit which function as a read out unit configured to read out the noise signal from each pixel in the pixel unit and to amplify the noise signal by a first gain to generate a first noise signal, wherein the read out unit reads out the pixel signal and amplifies the pixel signal by the first gain to generate a first pixel signal and amplifies the pixel signal by a second gain to generate a second pixel signal;

a first memory unit configured to store a second noise signal that is generated by amplifying, by the second gain, the noise signal read out from a pixel of a predetermined row in the pixel unit; and a subtraction unit configured to subtract the first noise signal from the first pixel signal and to subtract the second noise signal stored in the first memory unit from the second pixel signal, while sequentially reading out signals from each pixel of the pixel unit.

Further features of the present invention will become apparent from the following description of exemplary embodiments with reference to the attached drawings.

BRIEF DESCRIPTION OF THE DRAWINGS

FIG. 4A illustrates a timing chart for reading out signals from a certain row of the pixel unit according to Embodiment 1. FIG. 4B illustrates a timing chart for reading out second noise signal Gain2(N) from a predetermined row shielded from light.

DESCRIPTION OF THE EMBODIMENTS

Figure 1:
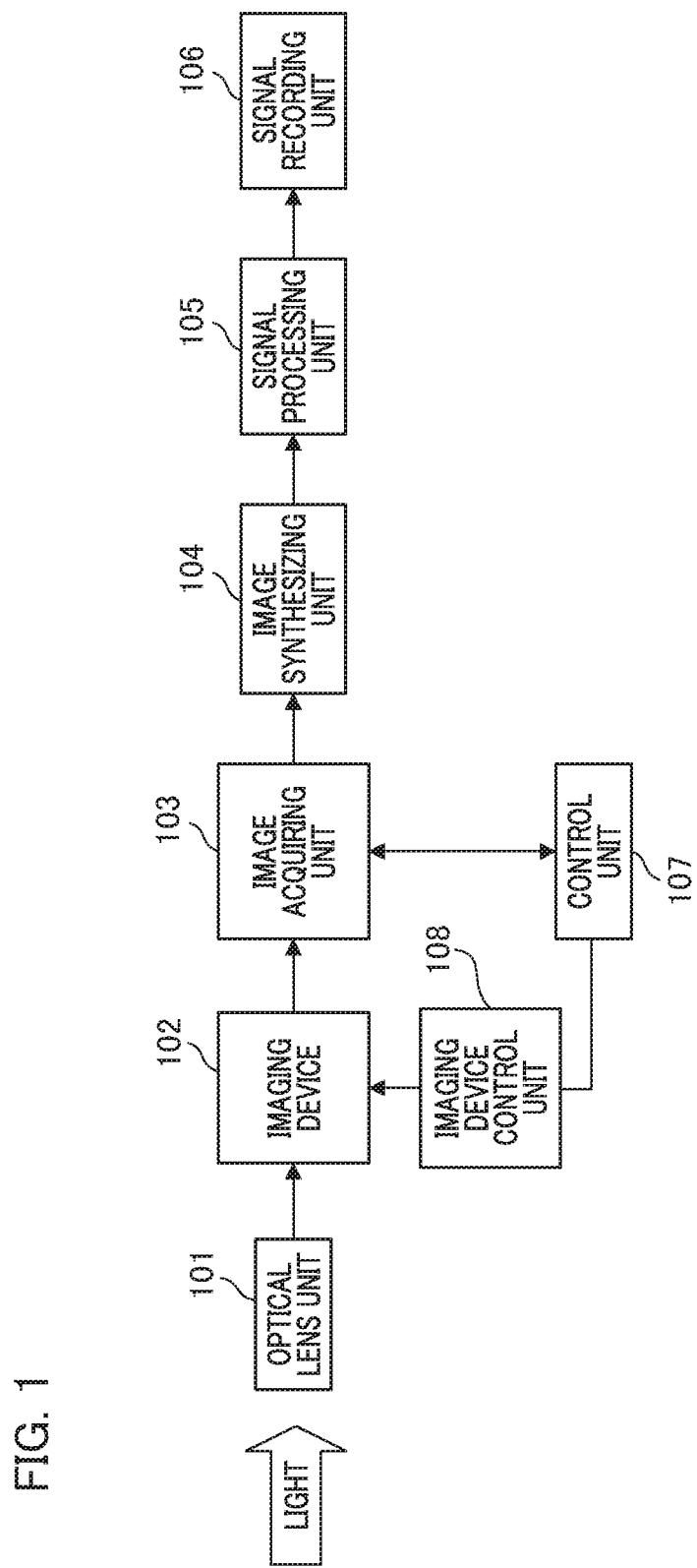
FIG. 1 is a block diagram of an imaging apparatus according to Embodiment 1.

Hereinafter, an imaging apparatus according to embodiments of the present invention will be described with reference to the drawings. Here, the same reference numerals are given to units that have the same functions throughout the drawings and repeated description thereof will be omitted.

Embodiment 1

In the following embodiments, although a digital still camera is explained as an imaging apparatus, the present invention is applicable to an imaging device of a digital video camera, a smartphone having a camera, a tablet computer having a camera, or the like.

FIG. 1 is a block diagram illustrating the imaging apparatus according to Embodiment 1.

101 denotes an optical lens unit for collecting light from an object to form an image on an imaging device 102. An imaging device 102 receives light from the optical lens unit 101 and photoconverts it into an electrical signal to output. The imaging device 102 may be a CCD (Charge Coupled Device) or a CMOS (Complementary Metal Oxide Semiconductor) image sensor.

An image acquiring unit 103 includes circuits for acquiring an image signal outputted from the imaging device 102 and for processing the image signal. If the imaging device 102 does not include an AD conversion function, then the image acquiring unit 103 may include an analog front end for the AD conversion function.

The image acquiring unit 103 also executes a process for deleting a fixed pattern noise from the image signal and for clamping a black level, to generate an image signal suitable for recording.

In addition, the image acquiring unit 103 also generates an evaluation value for controlling the imaging device.

An image synthesizing unit 104 includes circuits for synthesizing an HDR (High Dynamic Range) image signal by combining image signals outputted from the imaging device.

For example, the HDR image signal may be synthesized by combining a high gain image signal for ordinary luminance area and a low gain image signal for high luminance area such as an overexposed area, however the present embodiment is not limited to such synthesizing algorithm as far as image signals corresponding to at least two gains are synthesized.

An image processing unit 105 performs image processes such as pixel addition, noise reduction, gamma correction, knee correction, digital gain correction, defect correction, and so on.

The image acquiring unit 103 and the image processing unit 105 may include memories (not shown) for storing data used for those corrections or image processes.

An image recording unit 106 records the image signal processed by the image processing unit 105 in a recording apparatus or a recording medium.

A control unit 107 calculates an optical exposure amount based on the evaluation value outputted by the image acquiring unit 103, or calculates a phase difference amount for controlling focusing when a phase difference signal is obtained from the imaging device.

The control unit 107 controls an operation of an imaging device control unit 108.

In addition, the control unit 107 includes a CPU as a computer and can control other circuits in the imaging apparatus using a computer program stored in a memory (not shown) so as to function as a control means.

Figure 2:
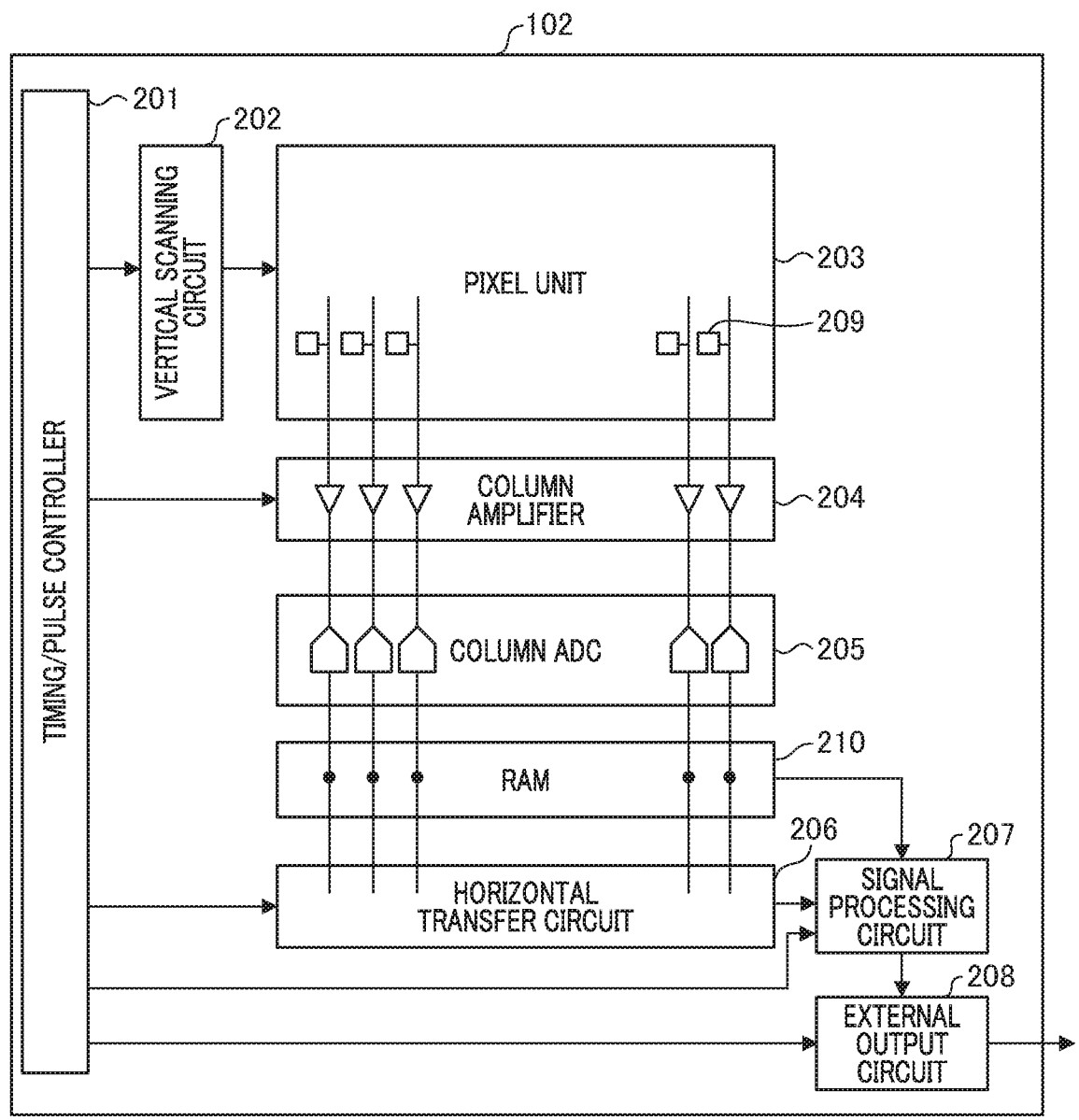
FIG. 2 is a block diagram of the imaging device according to Embodiment 1.

FIG. 2 is a block diagram illustrating a structure of the imaging device 102 according to Embodiment 1.

A timing pulse controller 201 provides clock signals and timing signals to each block of the imaging device 102 so as to control operations of the imaging device 102.

A pixel unit 203 includes a plurality of pixels arranged in rows and columns. In this embodiment, each pixel 209 in the pixel unit 302 includes a photodiode as a photoconverting element. Each photodiode receives light passing through a microlens (not shown) and a color filter (not shown) arranged in front of the photodiode.

The color filters for pixels 209 arranged in rows and columns includes RGB filters arranged, for example, in a Bayer arrangement.

In this connection, each pixel may include two photodiodes each for receiving light from different entrance pupils so that outputs from the two photodiodes may be selectively and separately read out to form phase difference signals for autofocusing or may be selectively added to form each pixel signal for generating a video signal.

A vertical scanning circuit 202 controls an operation of the pixel unit 203 to sequentially read out pixel signals row by row, in general, from upper rows to lower rows in the pixel unit 203 in one frame period.

A column amplifier 204 amplifies signals read out from the pixel unit 203 to each vertical output column line, column by column, wherein each column amplifier 202 includes an operational amplifier, which is explained below.

In this connection, by amplifying pixel signals from the pixel unit 203 at this stage by the column amplifier 204, S/N of the pixel signals are improved.

In this connection, the gain of the column amplifier 204 can be controlled by control signals from the timing pulse controller 201.

In this embodiment, the imaging device can output at least two kinds of pixel signals respectively amplified by different gains in order to generate the HDR image signal.

Although data amount increases when two gains are applied to each output signal read out at a certain timing from each photodiode, two output signals corresponding to the same timing, amplified by different gains, are obtained for each output signal.

A column ADC (Analog to Digital Converter) 205 AD converts the pixel signals amplified by the column amplifier 202. As explained below, the column ADC 205 respectively AD converts a first pixel signal and a second pixel signal amplified by different gains, and a first noise signal and a second noise signal amplified by different gains.

ARAM 210, which functions as a first memory unit, stores a second noise signal Gain2(N), which is obtained by amplifying, by a second gain (Gain2), the noise signal read out from a predetermined row shielded from light.

When a second pixel signal Gain2(S) is inputted to the signal processing circuit 207, the second noise signal Gain2(N) corresponding to the same column is read out from the RAM 210 so as to be subtracted from the second pixel signal Gain2(S).

The signals AD converted by the column ADC 205 are inputted to a horizontal transfer circuit 206 via the RAM 210, and are sequentially read out by a horizontal transfer circuit 206 to be provided to the signal processing circuit 207.

The signal processing circuit 207, as a subtraction unit, digitally processes the pixel signal so as to subtract the noise signal.

In addition, the signal processing circuit 207 may add a predetermined amount of offset value to the pixel signals or may perform a value shift operation or multiplication so as to control gain of the pixel signals.

Furthermore, the pixel unit 203 may include light shielded pixel area that can be used to perform a digital clamping operation against a black level.

The signals processed by the signal processing circuit 207 are provided to an external output circuit 208 for converting multi-bit-parallel signals from the signal processing circuit 207 into a serial signal.

The serial signal may be further converted into another digital signal such as a LVDS (Low Voltage Differential Signaling) and so on to be provided to an external apparatus.

In this connection, the imaging device 102 may be one semiconductor chip having a multi-layer structure, wherein the pixel unit 203 is arranged on an upper most layer that can receive light and the signal processing circuit 207 as the subtraction unit or the RAM 210 as the memory unit may be arranged on different layers.

Or, the imaging device 102 may be configured to form a stacked structure by stacking and electrically wiring plural semiconductor chips.

In that case, the pixel unit 203 is arranged on an upper most semiconductor chip that can receive light and the signal processing circuit 207 as the subtraction unit or the RAM 210 as the memory unit may be arranged on different semiconductor chips.

In addition, those circuits mentioned above are included in the imaging device 102 in this embodiment, a part of circuits such as the signal processing circuit 207 as the subtraction unit or the RAM 210 as the memory unit may be arranged in an external apparatus connected to the imaging device. Such structure will be explained below using FIG. 5.

Next, operations of the imaging device 102 and the image synthesizing unit 104 when generating the HDR image signal will be explained.

As mentioned earlier, the imaging device 102 of the present embodiment can change gains of the column amplifier to generate image signals for synthesizing the HDR image signal.

Figure 3:
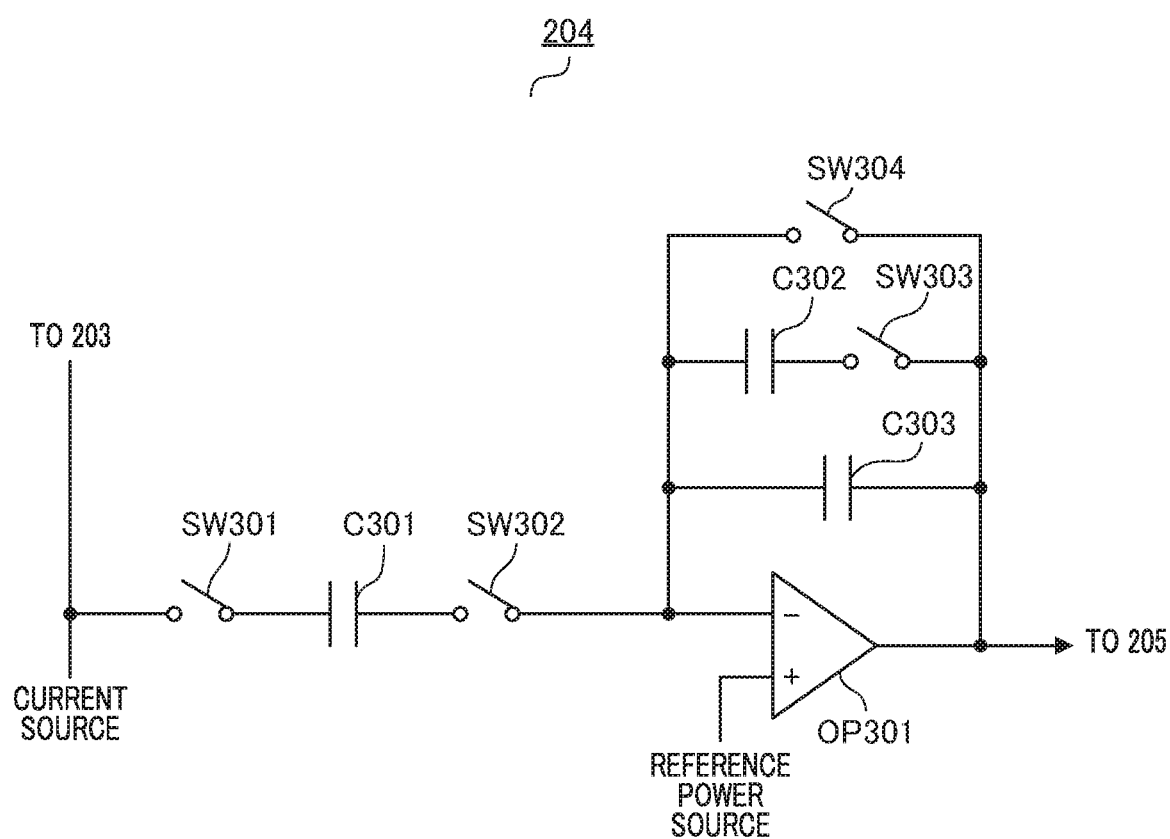
FIG. 3 is a diagram illustrating a column amplifier of the imaging device according to Embodiment 1.

FIG. 3 illustrates a circuit structure of the column amplifier 202 for a certain column.

An input capacitor C301 holds a signal received from the pixel unit 203 when a switch SW301 is ON and provides the signal held by the input capacitor C301 to an operational amplifier OP301 when a switch SW302 turns ON.

The operational amplifier OP301 is connected to the input capacitor C301 via the switch SW302, feedback capacitors C302 and C303, and connection to the feedback capacitor C302 is controlled by turning ON/OFF of the switch SW303.

A switch SW304 is for resetting the feedback capacitors.

An amplification factor (gain) of the operational amplifier is determined by a combination of the input capacitor and the feedback capacitors. Therefore, by turning ON/OF of the switch SW303, feedback capacity can be changed so that image signals amplified by different gains can be provided to be outputted to the column ADC 205.

Next, an operation for obtaining two image data with different gains will be explained referring to FIG. 4A.

FIG. 4A illustrates a timing chart for reading out signals from a certain row of the pixel unit 203 in one horizontal period, which is defined by horizontal synchronization signals HD.

Firstly, between timings t1 and t2, the switches SW301 to SW304 are turned ON at the same time, so that remaining charges in the operational amplifier 204 are reset. Net, at timing t3, the switches SW301 and SW302 are turned ON, and the noise component from the pixel unit is read out to be amplified by a first gain (Gain).

The first gain (Gain1) is defined as the following equation (1).

$$Gain1 = C301/C303 \quad (1)$$

By this operation, the first noise signal Gain1(N), which is generated by amplifying the noise component by the first gain Gain1, is provided to the column ADC 205.

Next, at timing t4, the pixel signal, which is a photoconversion signal, is read out from the pixel unit.

At this timing, since the switches SW303 and SW304 are OFF, the pixel signal is amplified by the first gain Gain1.

Therefore, the column ADC 205 receives the first pixel signal Gain1(S), which is obtained by amplifying the pixel signal by the first gain Gain1.

Next, at timing t5, switches SW301 and 302 are turned OFF, so as to suppress the fluctuation of signal levels so that the AD conversion by the column ADC 205 is less influenced.

At this time, the pixel signal also includes the noise component. In this connection, as mentioned before, the noise signal and the pixel signal obtained by photoconversion can be read out from each pixel.

Next, between timings t6 and 7, the switch SW304 is turned ON, so that the feedback capacitors are reset. Between timings t6 and t8, the switch SW303 is turned ON, so that the pixel signal in the input capacitor C301 is amplified by the second gain Gain2.

Here, the second gain Gain2 is represented by the following equation (2).

$$Gain2 = C301/(C302+C303) \quad (2)$$

In this period, the column ADC 205 receives the second pixel signal Gain2(S), which is obtained by amplifying the pixel signal by the Gain2.

In this connection, the imaging device control unit 108 functions as a read out unit.

Here, according to this reading out process, the noise component corresponding to the second gain Gain2 cannot be obtained from the same pixel, therefore in this embodiment, the noise component corresponding to the second gain Gain2 is obtained from a predetermined row shielded from light. FIG. 4B illustrates a timing chart for that.

In FIG. 4B, between timings t1 and t2, the switches SW301 to SW304 are turned ON at the same time, so that remaining charges in the operational amplifier 204 are reset. Then, between timings t9 and t10, switches SW301 and SW302 are turned ON, and between timings t9 and t11, switch SW303 is turned ON, so that the second noise signal Gain2(N), which is obtained by amplifying the pixel signal from the predetermined row shielded from light by the second gain Gain2, is read out.

Since this row is used for obtaining the second noise signal Gain2(N), it is not necessary to read out the pixel signal, however, the pixel signal may be read out from this row.

As shown in FIG. 4B, since the second noise signal Gain2(N) is obtained by reading out signals from the predetermined row shielded from light, so that the second noise signal Gain2(N) can be used to be subtracted from the signal Gain2(S) according to an equation (3).

$$Gain2(S) - Gain2(N) \quad (3)$$

That is, the signal processing circuit 207 performs a calculation based on the equation (3) so that the noise component amplified by Gain2 is deleted from the second pixel signal Gain2(S).

In the present embodiment, as shown in FIG. 2, the imaging device includes the RAM 210 (first memory unit), which includes a plurality of memory units, each of which corresponds to each vertical output column line to store the second noise signal Gain2(N) read out from a predetermined row shielded from light and amplified by the second gain Gain2.

The second noise signal Gain2(N) stored in the RAM 210 is repeatedly subtracted with the signal processing circuit 207 from all the rows of the second pixel signal Gain2(S) read out row by row from all the pixels.

In this embodiment, although the second noise signal Gain2(N) from the predetermined row shielded from light is commonly used for all the pixels as explained above, the black level of the image signal is sufficiently fixed so that the pedestal level of the image signal can be stabilized and the HDR image can be properly synthesized.

As explained above, according to the present embodiment, the read out unit reads out the noise signal from each pixel and amplifies the noise signal the first gain to generate a first noise signal. Then the read out unit reads out the pixel signal and amplifies the pixel signal by the first gain to generate a first pixel signal and amplifies the pixel signal by a second gain to generate a second pixel signal.

The above reading out operations are carried out row by row in each horizontal period. Here, the first gain is larger than the second gain. That is, the first gain is high gain and the second gain is low gain.

In addition, the signal processing circuit 207, as the subtraction unit, subtracts the first noise signal from the first pixel signal and subtracts the second noise signal stored in the first memory unit from the second pixel signal, while sequentially reading out signals from each pixel of the pixel unit.

Furthermore, since the first memory unit stores the second noise signal generated by amplifying, by the second gain, the noise signal read out from the pixel of a predetermined row shielded from light in the pixel unit, the black level of the image signal is fixed so that the pedestal level of the image signal is stabilized and synthesizing images and so on can be properly performed.

In this connection, since the circuit structure illustrated in this embodiment is one of examples, any other structure that can amplify the pixel signal by at least two kind of gains may be used.

In addition, the structure or layout of the RAM 210 may be suitably modified.

Embodiment 2

In Embodiment 1, the second noise signal Gain2(N) is stored in the RAM 210 included in the imaging device and calculation of Gain2(S)−Gain2(N) is carried out by the signal processing circuit 207 in the imaging device.

In Embodiment 2, the second noise signal Gain2(N) is provided from the imaging device to an external device and is processed by the external device.

Figure 5:
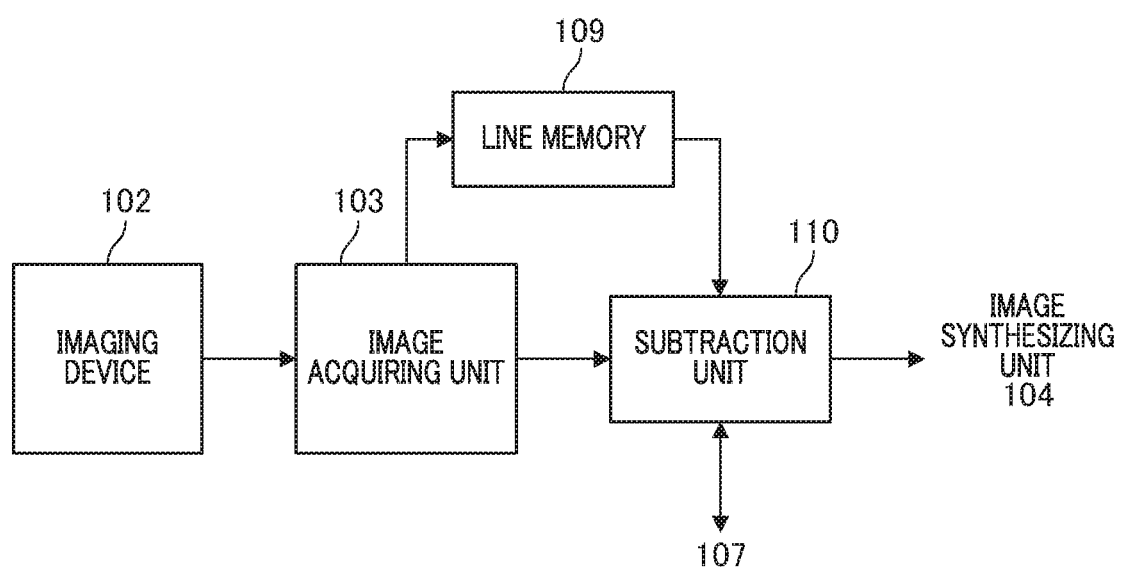
FIG. 5 is a block diagram of a part of the imaging apparatus according to Embodiment 2.

FIG. 5 is a block diagram of a part of the imaging apparatus according to Embodiment 2, where only different parts from Embodiment 1 is depicted.

In FIG. 5, differences from FIG. 1 include that a line memory 109 and a subtraction unit 110 are added to the image acquiring unit 103 of FIG. 1. That is, instead of the RAM 210 in FIG. 2, the line memory 109 is used and instead of the signal processing circuit 207 in FIG. 2, the subtraction unit 110 is used.

Figure 6:
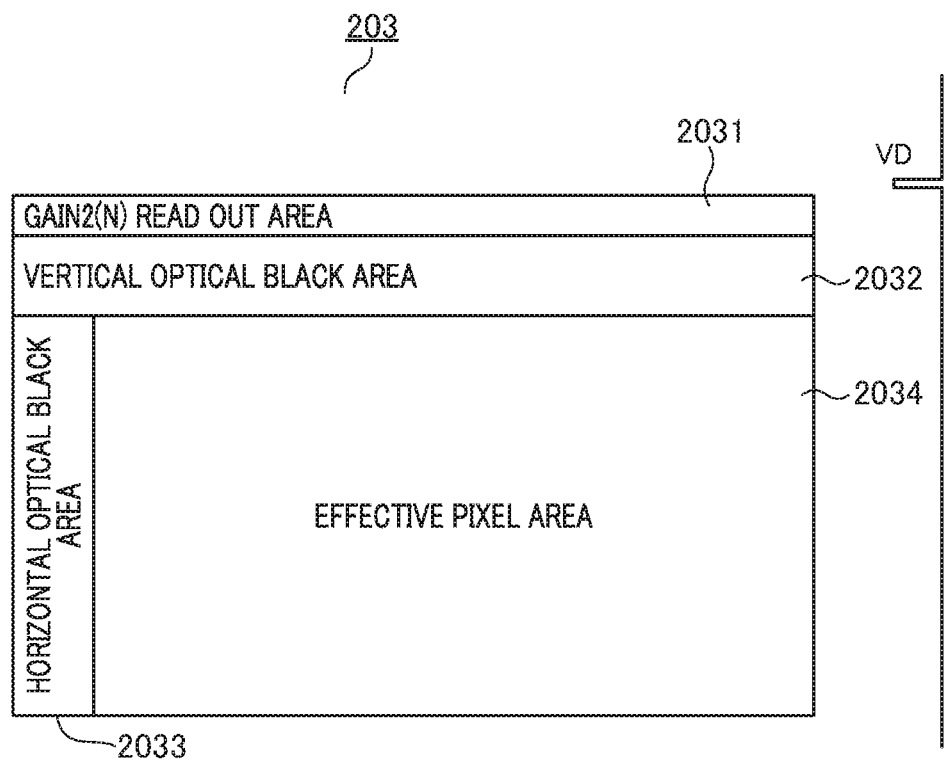
FIG. 6 is a front view illustrating a pixel unit of the imaging device according to Embodiment 1.

FIG. 6 is a front view illustrating a structure of the pixel unit of an imaging device according to embodiments.

Image signals are read out in synchronism with a vertical synchronization signal VD. As a first row to be read out from the pixel unit, GAIN2(N) read out area 2031 is located at an upper most part of the pixel unit.

The noise signal read out from the GAIN2(N) read out area 2031 via each vertical output column line is amplified by the Gain 2 to generate the second noise signal Gain2(N) and is stored in the line memory 109 in FIG. 5.

Below the GAIN2(N) read out area 2031, a vertical optical black area 2032 that is shielded from light for obtaining a vertical optical black signal is located.

In addition, below the vertical optical black area 2032, an effective pixel area 2034 for receiving light and a horizontal optical black area 2033 shielded from light for obtaining a horizontal optical black signal are located, wherein the horizontal optical black area 2033 is located adjacent to a horizontal end part of the effective pixel area 2034.

Here, although the GAIN2(N) read out area 2031 is located at the uppermost end adjacent to the vertical optical black area 2032, which is at the vertical peripheral part of the effective pixel area 2034, the GAIN2(N) read out area 2031 as a row shielded from light may be located anywhere in the pixel unit or may be one of rows within the vertical optical black area 2032.

The second noise signal Gain2(N) stored in the line memory 109 is subtracted by the subtraction unit 110 from the second pixel signal Gain2(S), which is shown in FIG. 4A, read out from the effective pixel area.

In this connection, a plurality of the second noise signal Gain2(N) obtained from a plurality of frames may be averaged with a predetermined time constant to be stored in the line memory 109 so that the averaged second noise signal Gain2(N) is subtracted from the second pixel signal Gain2(S).

Or, the GAIN2(N) read out area 2031 may include a plurality of rows and the second noise signal Gain2(N) obtained from the plurality of rows may be averaged to be stored in the line memory 109 so that the averaged second noise signal Gain2(N) is subtracted from the second pixel signal Gain2(S).

Here, since the noise component amplified by the first gain and the pixel signal amplified by the first gain are read out in the horizontal period, they are subtracted inside the imaging device without being subtracted outside of the imaging device.

In a case where differences of black levels among pixels in the row shielded from light is small, the second noise signals Gain2(N) obtained from the row shielded from light may be averaged so as to be used as the black level of the second pixel signals Gain2(S).

According to this embodiment, the second noise signal Gain2(N) is stored in the line memory outside of the imaging device and is subtracted from the second pixel signal Gain2(S), so that the black level of the second pixel signal Gain2(S) is fixed and the processes in the synthesizing circuit is properly carried out.

Embodiment 3

Figure 7:
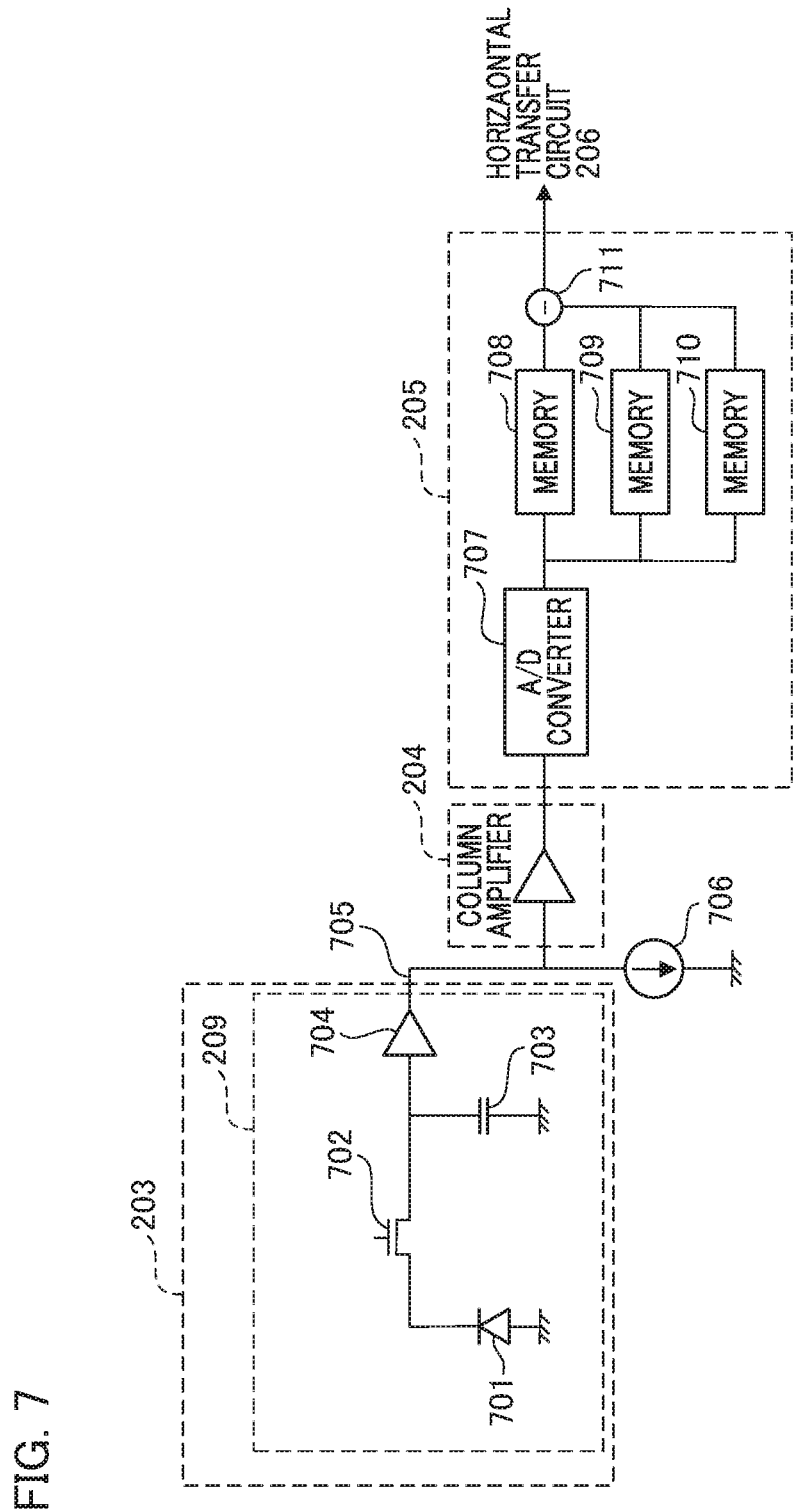
FIG. 7 is a block diagram of the imaging device according to Embodiment 3.

Next, Embodiment 3 will be explained referring to FIG. 7, which is a block diagram of the imaging device according to Embodiment 3. In FIG. 7, one of the pixel in the imaging device and column amplifiers connected to the pixel are illustrated.

In this embodiment, the RAM 210 in FIG. 2 is included within the column ADC 205.

A signal processing for the pixel 209 to the horizontal transfer circuit 206 will be explained referring to FIG. 7.

The pixel 209 includes a photoconverting element (photodiode) 701, which receives light passing through a micro lens (not shown) to photoconverts into a charge signal.

A transfer switch 702 selectively transfers the charge signal generated by the photoelectric conversion element to a charge storage portion 703, where the charge signal generated by the photoelectric conversion element is temporarily stored.

A pixel amplifier 704 amplifies the charge signal in the charge storage portion 703 and transfers signals via a vertical output column line 705 to a column amplifier 204.

A current control unit 706 controls a current supplied to the vertical output column line 705.

Memories 708 to 709 in the column ADC 205 temporarily store digital signals AD converted by the AD converter 707.

The memory 708 is a memory as a second memory unit for storing pixel signals read out from the photoconverting element.

The memory 708 stores S+N SIGNAL, that is the pixel signal mixed with the noise signal caused by a read out circuit including circuits from the charge storage portion 703 to the AD converter 707.

The memory 709 is a memory as a third memory unit for storing the noise signal amplified by the first gain.

The memory 710 is a memory as a first memory unit for storing the noise signal read out from the row shielded from light and amplified by the second gain by the read out circuit.

In this connection, the pixel signal read out from the row shielded from light can be substantially regarded as the noise signal caused by the read out circuit.

A subtractor 711, as a subtraction unit, subtracts data stored in the memory 709 or the memory 710 from data stored in the memory 708 and provides the resulting data to a horizontal transfer circuit 206.

Figure 8:
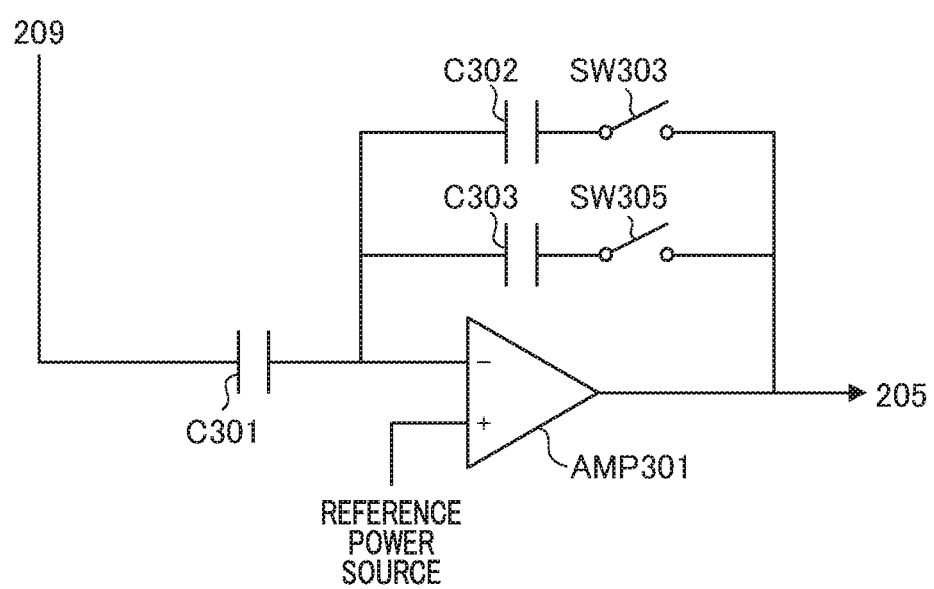
FIG. 8 is a diagram illustrating a column amplifier of the imaging device according to Embodiment 3.

Next, FIG. 8 is a diagram illustrating a column amplifier of the imaging device according to Embodiment 3.

Referring to FIG. 8, a method according to Embodiment 3 for reading out pixel signals for generating a signal with an expanded dynamic range will be explained.

In this embodiment, a low luminance portion of an image signal is read out with a high gain and a high luminance portion of the image signal is read out with a low gain, so that they are synthesized in a succeeding signal process circuit to obtain an image data with a wide dynamic range.

A column amplifier 204 is an inverse amplifying circuit including an operational amplifier AMP 301, an input capacitor C301, a feedback capacitors C302 and C303, and switches SW303 and SW305.

The switches SW303 and SW305 are for changing gains.

When reading out the image signal of a proper luminance portion, the switch SW303 is turned OFF and the switch SW305 is turned ON, so that pixel signal amplified by a high gain is obtained.

When reading out the image signal of a high luminance portion, both of the switch SW303 and switch SW305 are turned ON, so that pixel signal amplified by a low gain is obtained.

As explained above, using the switch SW303 and switch SW305, the feedback capacitance is changed so that the pixel signals with different gains are obtained.

Figure 9:
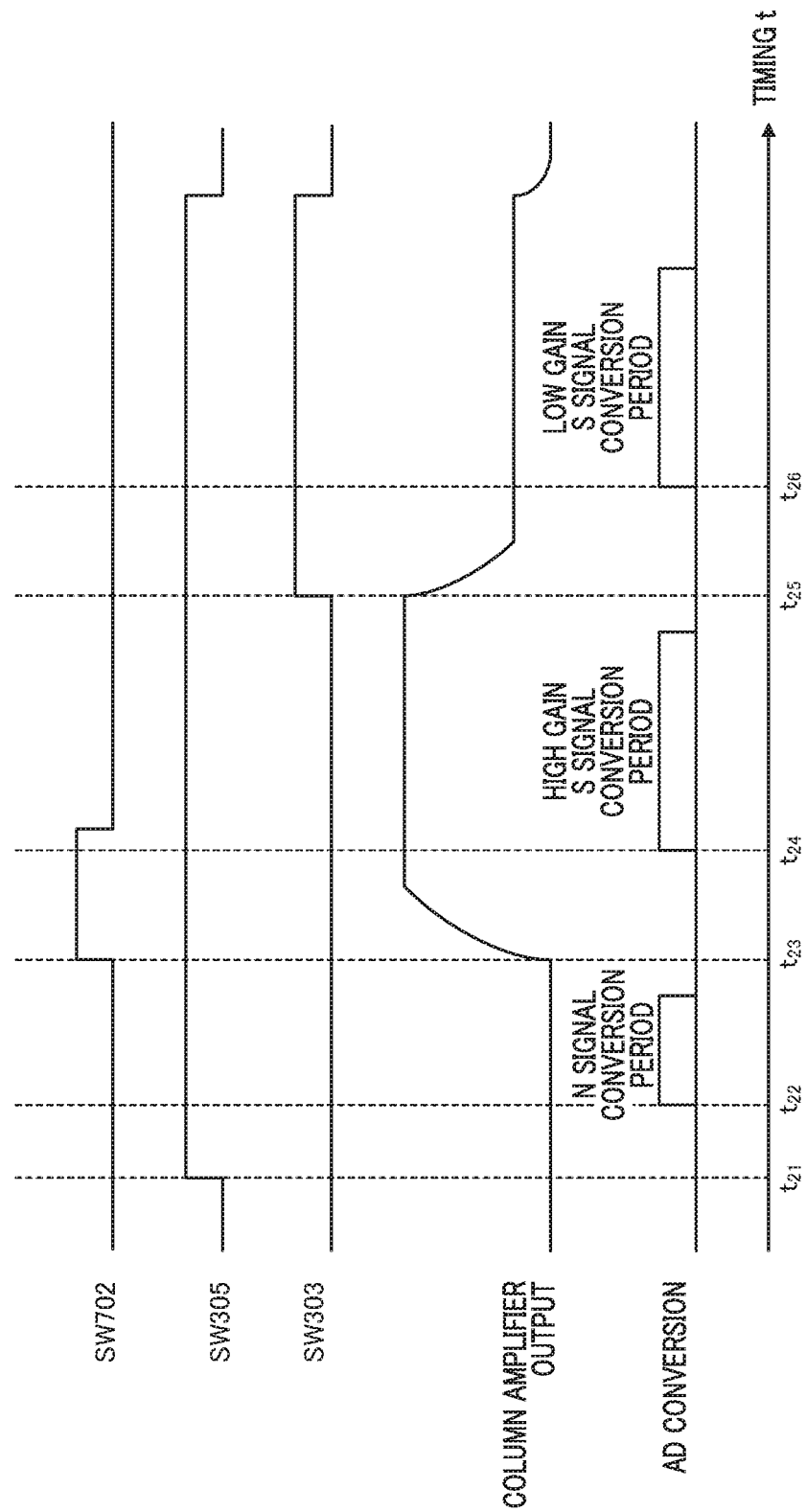
FIG. 9 is a timing chart illustrating an operation of the column amplifier according to Embodiment 3.

FIG. 9 is a timing chart illustrating an operation of the column amplifier according to Embodiment 3. Referring to FIG. 9, a method for reading out pixel signals is briefly explained.

Firstly, the switch SW303 is turned OFF and the switch SW305 is turned ON, so that the gain of the column amplifier 204 is set to high. (timing t21)

In this condition, before the switch 702 connected to the photoconverting element is turned ON, the noise component (N SIGNAL) is read out from the pixel and is amplified by the high gain, and then is AD converted. (timing t22)

At timing t23, the switch 702 connected to the photoconverting element is turned ON so that the pixel signal (S SIGNAL) is read out to be amplified by the high gain. Then, the pixel signal (S SIGNAL) amplified by the high gain is AD converted to output a high gain S signal. (timing t24)

Next, at timing t25, the switch SW303 is turned ON, so that the gain of the column amplifier 202 is set to low.

Then, the pixel signal (S SIGNAL) amplified by the low gain is AD converted to provide a low gain S signal. (timing t26)

As explained above, when reading out image signals, by changing gains of the column amplifier, image signals obtained at the same timing and having different gains are obtained, which can be used for synthesizing data with a wide dynamic range.

However, the reading out method explained in the above, an S–N process for the low gain S SIGNAL is not possible, because the low gain N SIGNAL does not exist.

If the gain of the column amplifier 202 is changed to low after timing t22 and the low gain N SIGNAL is provided, then a time period between the high gain N signal and the high gain S signal becomes long and a time period between the low gain N signal and the low gain S signal becomes long.

Therefore, the noise component may change during those periods and, as a result, the S–N process becomes unreliable.

Figure 10:
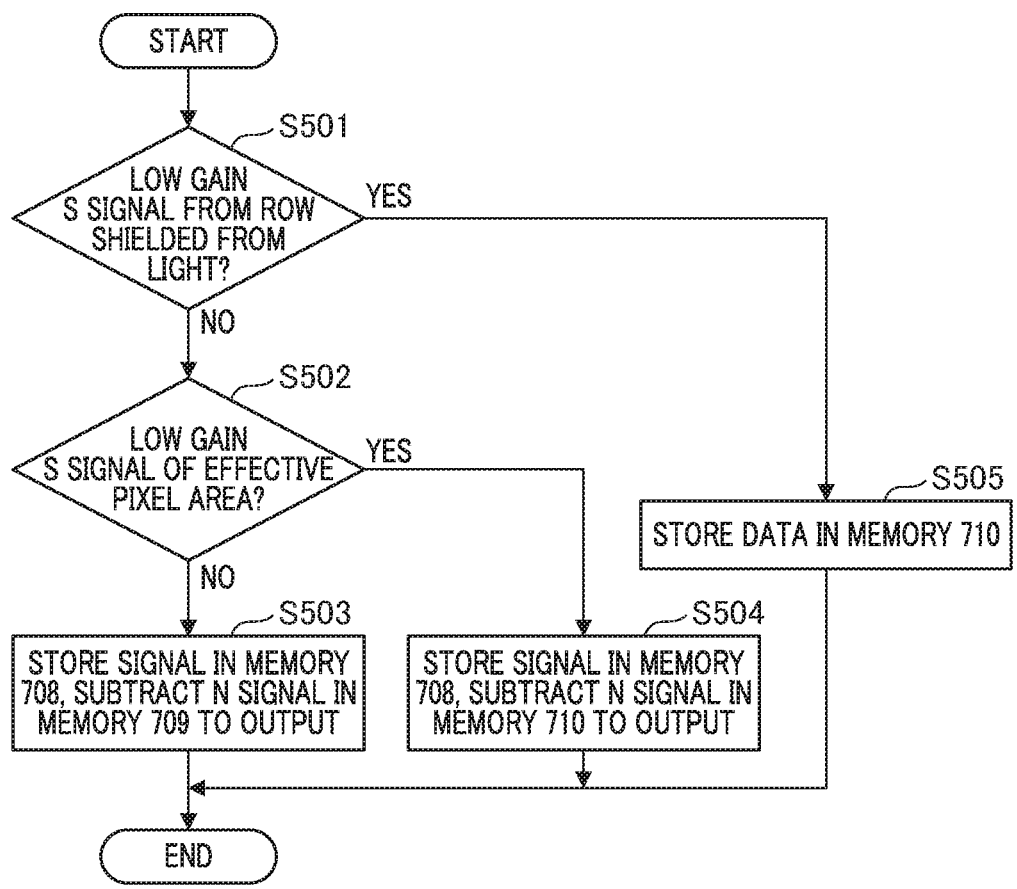
FIG. 10 is a flowchart of processes in the imaging apparatus according to Embodiment 3.

In the Embodiment 3, a process illustrated by FIG. 10 is executed, wherein FIG. 10 is a flowchart of processes in the imaging apparatus according to Embodiment 3.

First, in step S501, it is judged whether a signal readout from the imaging device is the low gain S SIGNAL read out from the predetermined row shielded from light, which is, for example, the GAIN2(N) read out area 2031. If Yes in step S501, the process proceeds to step S505 and the signal read out from the imaging device is stored in the memory 710 as the second noise signal GAIN2(N).

If No in the step S501, the process proceeds to step S502 and it is judged whether the signal read out from the imaging device is the low gain S SIGNAL read out from the effective pixel area 2034 or not.

If No in the step S502, that means the signal readout from the imaging device is the high gain S SIGNAL, the process proceeds to step S503. In the step S503, the high gain S SIGNAL is stored in the memory 708 and the N SIGNAL stored in the memory 709 is subtracted from the high gain S SIGNAL stored in the memory 708 for executing the S–N process and output a resulting data.

If Yes in the step S502, that means the signal read out from the imaging device is the low gain S SIGNAL read out from the effective pixel area, the process proceeds to step S504.

In the step S504, the low gain S SIGNAL is stored in the memory 708 and the low gain N SIGNAL stored in the memory 710 is subtracted from the low gain S SIGNAL stored in the memory 708.

Here, the low gain N SIGNAL stored in the memory 710 is substantially the low noise N SIGNAL because the low gain N SIGNAL stored in the memory 710 is obtained from the row shielded from light.

By using the above low gain N SIGNAL stored in the memory 710, the S–N process for the low gain S SIGNAL is realized.

Embodiment 4

In Embodiment 1 to Embodiment 3, the N SIGNAL amplified by one of the gains is obtained from the row shielded from light, such as the GAIN2(N) read out area 2031 adjacent to the vertical optical black area 2032, and using N SIGNAL amplified by one of the gains, the S–N process is performed.

However, if there is a shading component in a vertical direction of the pixel unit, the S–N process may not be properly performed when using merely the N SIGNAL obtained from the GAIN2(N) read out area 2031.

Therefore, in Embodiment 4, an N SIGNAL obtained from pixel area that is shielded from light and is located at a horizontal end of the pixel unit is additionally used to perform the S–N process.

Figure 11:
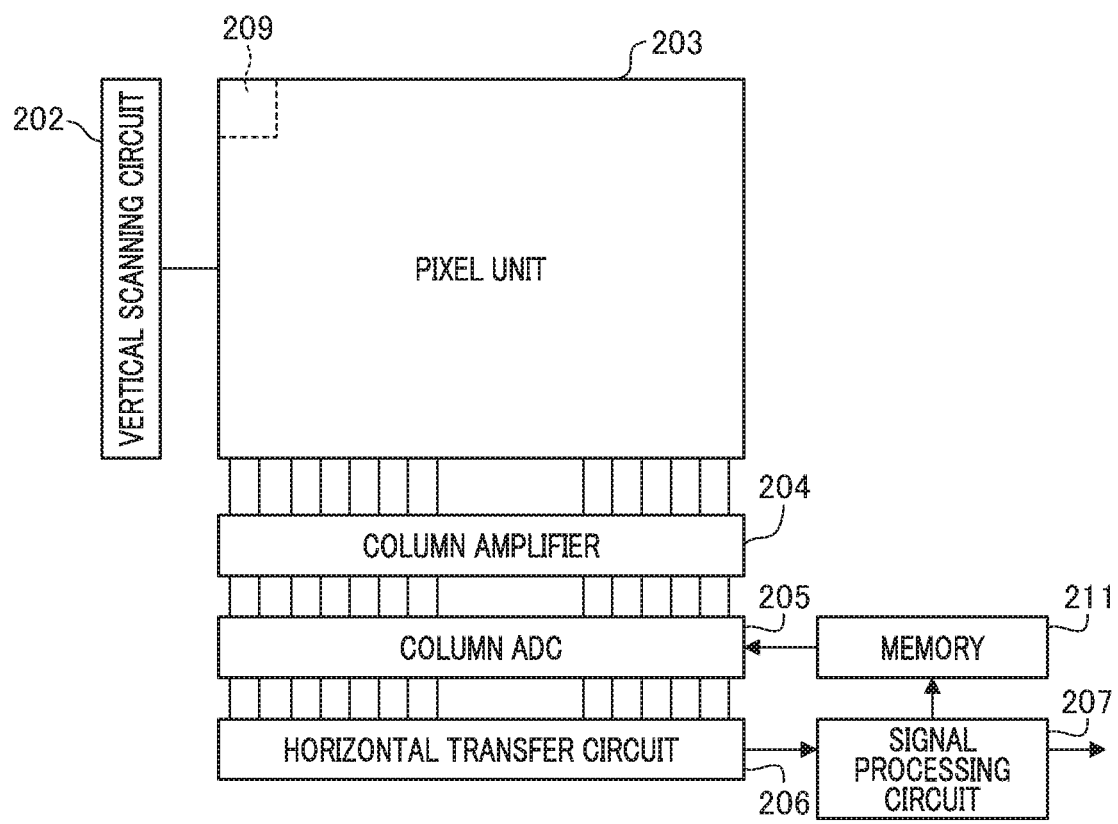
FIG. 11 is a block diagram of the imaging device according to Embodiment 4.

FIG. 11 is a block diagram of the imaging device according to Embodiment 4.

The structure shown in FIG. 4 is basically the same as that shown in FIG. 2, however, instead of the RAM 210, a memory 211 as a fourth memory unit is provided.

The memory 211 stores only a vertical shading component calculated, row by row, by the signal processing circuit 207, which functions as an operation unit.

The vertical shading component is calculated by the signal processing circuit 207 using signals read out from the horizontal optical black area 2033 located left side of the effective pixel area 2034.

Next, a flow of processes performed by the pixel unit 203 to the horizontal transfer circuit 206 will be explained referring to FIG. 12.

Figure 12:
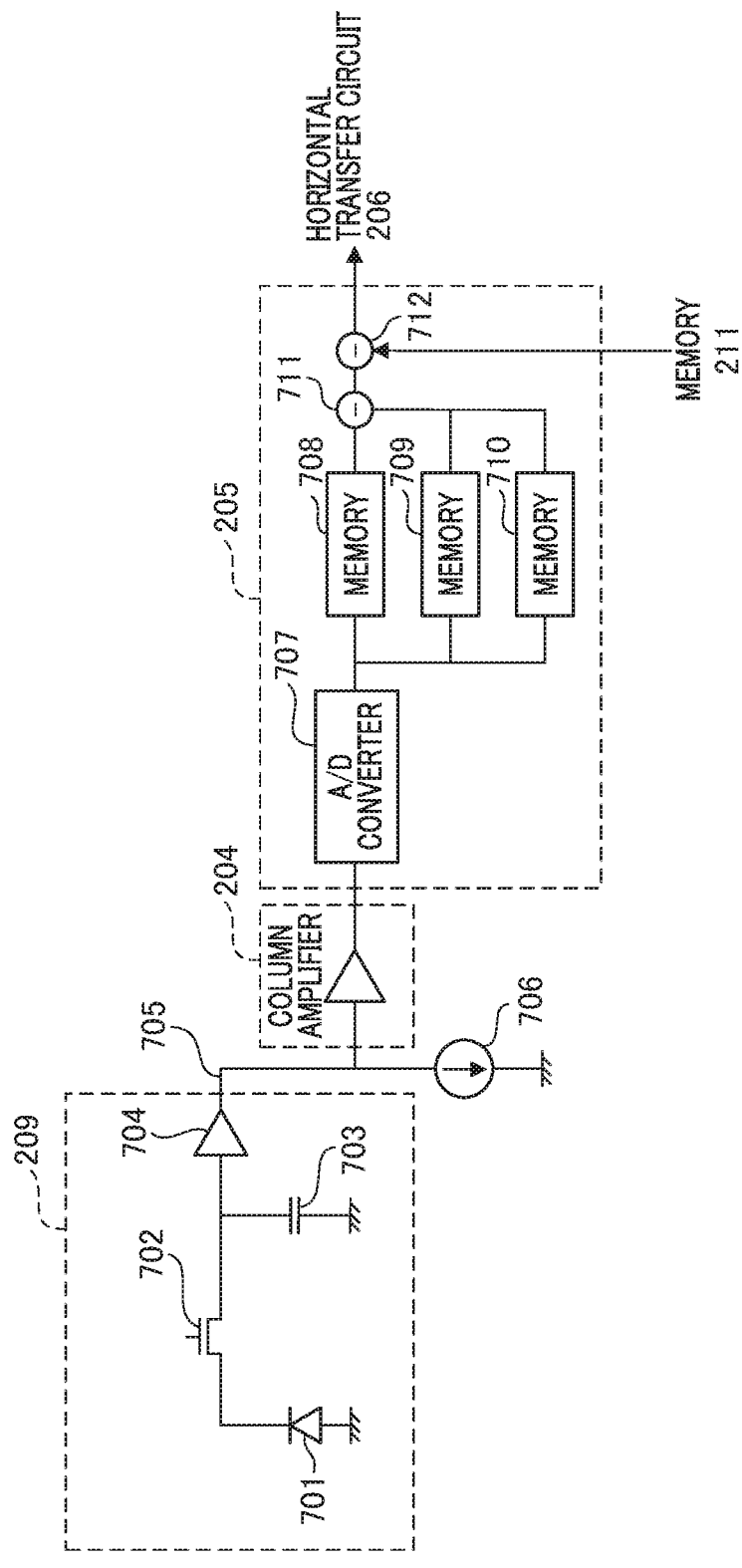
FIG. 12 is a block diagram of the imaging device according to Embodiment 4.

FIG. 12 is a block diagram of the imaging device according to Embodiment 4.

Although the structure shown in FIG. 12 is basically the same as that shown in FIG. 7, a subtractor 712 is added, so that after the S–N process using the memories 708 to 710, data stored in the memory 211 is subtracted from an output of the S–N process.

Since the memory 211 stores the vertical shading component of each row, after the S–N process using the N SIGNAL from the row shielded from light, which is for example the GAIN2(N) read out area 2031, the vertical shading component is subtracted by the subtractor 712, so that a proper S SIGNAL without the vertical shading can be obtained.

In this connection, the subtractor 712 subtracts the vertical shading component form the pixel signal as a result.

Figure 13:
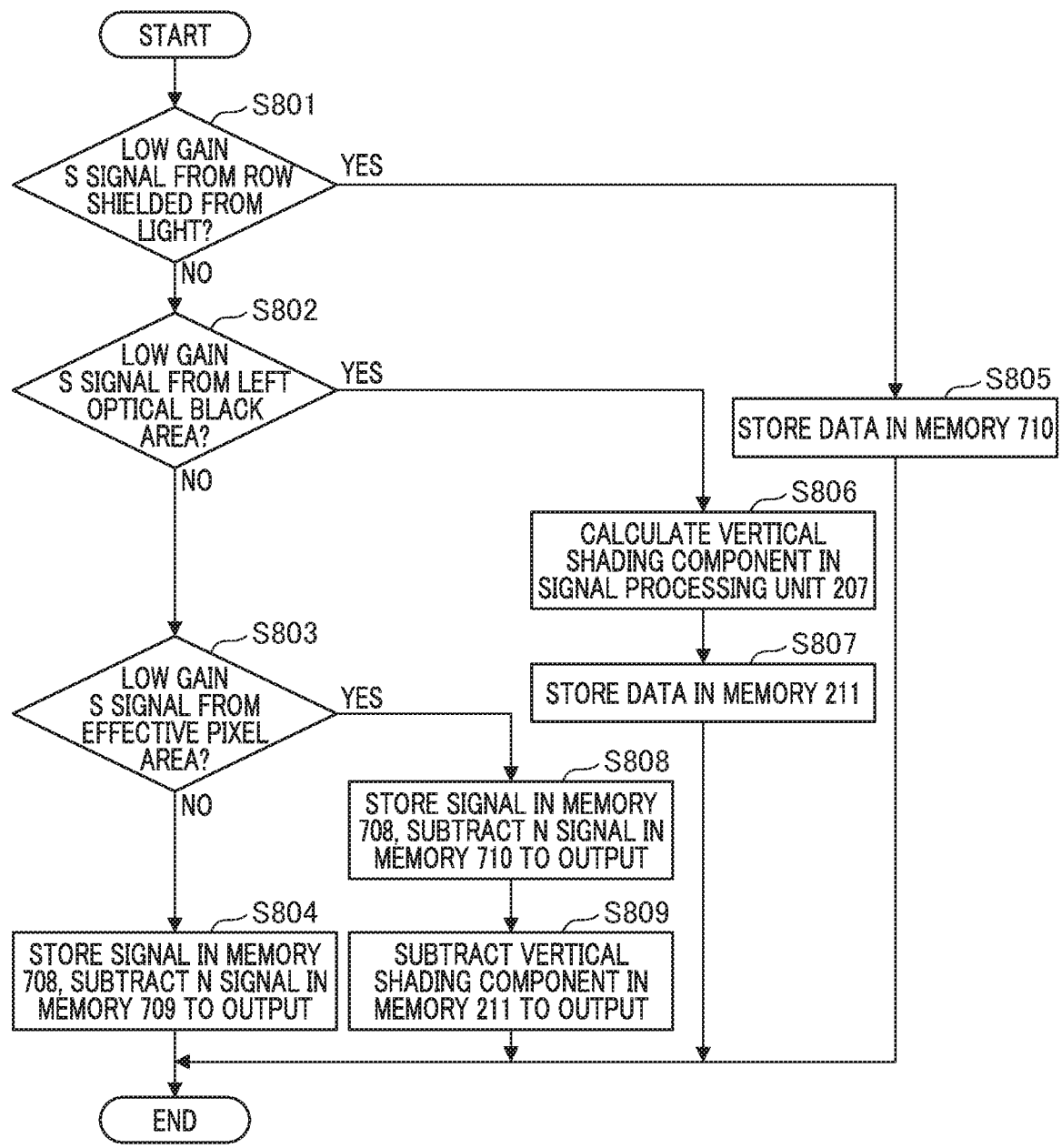
FIG. 13 is a flowchart of processes in the imaging apparatus according to Embodiment 4.

FIG. 13 is a flowchart of processes in the imaging apparatus according to Embodiment 4.

First, in step S801, it is judged whether a signal read out from the imaging device is the low gain S SIGNAL read out from the predetermined row shielded from light, which is, for example, the GAIN2(N) read out area 2031. If Yes in the step S801, the process proceeds to step S805 and the signal read out from the imaging device is stored in the memory 710 as the second noise signal GAIN2(N).

If No in the step S801, the process proceeds to step S802 and it is judged whether the signal read out from the imaging device is the low gain S SIGNAL read out from the horizontal optical black area 2033, which is shielded from light and is located left side of the effective pixel area 2034. If Yes in the step S802, the process proceeds to step S806 and the signal processing circuit 207 calculates the vertical shading component.

Then, the vertical shading component calculated by the signal processing circuit 207 is stored in the memory 211 in step S807.

If No in the step S802, the process proceeds to step S803 and it is judged whether the signal read out from the imaging device is the low gain S SIGNAL read out from the effective pixel area 2034 or not.

If No in the step S803, that means the signal readout from the imaging device is the high gain S SIGNAL read out from the effective pixel area 2034, the process proceeds to step S804. In the step S804, the high gain S SIGNAL read out from the effective pixel area 2034 is stored in the memory 708 and the high gain N SIGNAL stored in the memory 709 is subtracted from the high gain S SIGNAL stored in the memory 708 for executing the S–N process and output a resulting data.

If Yes in the step S803, that means the signal readout from the imaging device is the low gain S SIGNAL read out from the effective pixel area, the process proceeds to step S808. In the step S808, the low gain S SIGNAL is stored in the memory 708 and the low gain N SIGNAL stored in the memory 710 is subtracted from the low gain S SIGNAL stored in the memory 708.

Then, the process proceeds to step S809 and the vertical shading component stored in the memory 211 corresponding to the same row, is subtracted by the subtractor 712. In general, pixel signals are sequentially read out, row by row from upper rows to lower rows in the pixel unit 203 in FIG. 6, so that in order to subtract the vertical shading component of the N SIGNAL, pixel signals in a previous frame may be used. According to Embodiment 4, it is possible to eliminate the vertical shading component of the N SIGNAL.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

In addition, as apart or the whole of the control according to this embodiment, a computer program realizing the function of the embodiment described above may be supplied to the imaging apparatus through a network or various storage media. Ten, a computer (or a CPU, an MPU, or the like) of the imaging apparatus may be configured to read and execute the program. In such a case, the program and the storage medium storing the program configure the present invention.

This application claims the benefit of Japanese Patent Application No. 2019-082868 filed on Apr. 24, 2019, which are hereby incorporated by reference herein in its entirety.

What is claimed is:

1. An imaging apparatus comprising:
a pixel unit including a plurality of pixels arranged in rows and columns, wherein each pixel can output a noise signal and a pixel signal that is generated by photoconversion;
at least one processor or circuit which function as
a read out unit configured to read out the noise signal from each pixel in the pixel unit and to amplify the noise signal by a first gain to generate a first noise signal, wherein the read out unit reads out the pixel signal and amplifies the pixel signal by the first gain to generate a first pixel signal and amplifies the pixel signal by a second gain to generate a second pixel signal;
a first memory unit configured to store a second noise signal that is generated by amplifying, by the second gain, the noise signal read out from a pixel of a predetermined row in the pixel unit; and
a subtraction unit configured to subtract the first noise signal from the first pixel signal and to subtract the second noise signal stored in the first memory unit from the second pixel signal, while sequentially reading out signals from each pixel of the pixel unit.

2. The imaging apparatus according to claim 1, wherein the imaging apparatus is a semiconductor imaging device.

3. The imaging apparatus according to claim 2, wherein the semiconductor imaging device includes a multi-layered structure.

4. The imaging apparatus according to claim 3, wherein the pixel unit and the subtraction unit are respectively arranged in different layers.

5. The imaging apparatus according to claim 1, wherein the pixel unit is included in a semiconductor imaging device and the first memory unit is included in an external device that is different from the semiconductor imaging device.

6. The imaging apparatus according to claim 1, wherein the pixel unit is included in a semiconductor imaging device and the subtraction unit is included in an external device that is different from the semiconductor imaging device.

7. The imaging apparatus according to claim 1, wherein the predetermined row in the pixel unit is arranged in a vertical end part of the pixel unit.

8. The imaging apparatus according to claim 7, wherein the predetermined row is shielded from light.

9. The imaging apparatus according to claim 1, wherein the predetermined row is shielded from light.

10. The imaging apparatus according to claim 1, wherein the predetermined row in the pixel unit is arranged adjacent to an optical black area for reading out a vertical optical black signal.

11. The imaging apparatus according to claim 1, wherein the predetermined row in the pixel unit is included in an optical black area for reading out a vertical optical black signal.

12. The imaging apparatus according to claim 1, wherein the read out unit reads out the noise signal from each pixel in the pixel unit, amplifies the noise signal by a first gain to generate a first noise signal, reads out the pixel signal and amplifies the pixel signal by the first gain to generate a first pixel signal, and amplifies the pixel signal by the second gain to generate a second pixel signal in this order.

13. The imaging apparatus according to claim 12, wherein the read out unit reads out the noise signal from each pixel in the pixel unit, amplifies the noise signal by a first gain to generate a first noise signal, reads out the pixel signal and amplifies the pixel signal by the first gain to generate a first pixel signal, and amplifies the pixel signal by the second gain to generate a second pixel signal in this order in a horizontal line period.

14. The imaging apparatus according to claim 1, further comprising an AD conversion unit for AD converting the first noise signal, the first pixel signal, the second pixel signal, and the second noise signal.

15. The imaging apparatus according to claim 1, further comprising a second memory unit for storing the first pixel signal, the second pixel signal.

16. The imaging apparatus according to claim 1, further comprising a third memory unit for storing the first noise signal.

17. The imaging apparatus according to claim 1, further comprising an amplifier for amplifying signals read out from the pixel.

18. The imaging apparatus according to claim 17, wherein the amplifier includes an operational amplifier.

19. The imaging apparatus according to claim 1, further comprising an operation unit for amplifying, by the second gain, the noise signal read out from a pixel that is shielded from light and is arranged in a horizontal end part of the pixel unit, to obtain a vertical shading component.

20. The imaging apparatus according to claim 19, further comprising a fourth memory unit for storing the vertical shading component obtained by the operation unit.

21. The imaging apparatus according to claim 20, wherein the subtraction unit subtracts from the pixel signal the vertical shading component stored in the fourth memory unit.

22. An imaging method for executing an imaging process by using a pixel unit including a plurality of pixels arranged in rows and columns, wherein each pixel can output a noise signal and a pixel signal that is generated by photoconversion comprising:
reading out the noise signal from each pixel in the pixel unit and to amplify the noise signal by a first gain to generate a first noise signal, wherein the reading out also includes reading out the pixel signal and amplifying the pixel signal by the first gain to generate a first pixel signal and amplifies the pixel signal by a second gain to generate a second pixel signal;
storing a second noise signal that is generated by amplifying, by the second gain, the noise signal read out from a pixel of a predetermined row in the pixel unit;
subtracting the first noise signal from the first pixel signal; and
subtracting the second noise signal stored in the storing step from the second pixel signal, while sequentially reading out signals from each pixel of the pixel unit.

23. A non-transitory computer readable storage medium storing a computer program causing a computer to execute the following imaging process by using a pixel unit including a plurality of pixels arranged in rows and columns, wherein each pixel can output a noise signal and a pixel signal that is generated by photoconversion, the imaging process comprising:
reading out the noise signal from each pixel in the pixel unit and to amplify the noise signal by a first gain to generate a first noise signal, wherein the reading out also includes reading out the pixel signal and amplifying the pixel signal by the first gain to generate a first pixel signal and amplifies the pixel signal by a second gain to generate a second pixel signal;
storing a second noise signal that is generated by amplifying, by the second gain, the noise signal read out from a pixel of a predetermined row in the pixel unit;
subtracting the first noise signal from the first pixel signal; and
subtracting the second noise signal stored in the storing step from the second pixel signal, while sequentially reading out signals from each pixel of the pixel unit.

* * * * *